W. H. COLDWELL.
LAWN MOWER.
APPLICATION FILED MAY 6, 1913.

1,082,931.

Patented Dec. 30, 1913.
2 SHEETS—SHEET 1.

Witnesses

Inventor
William H. Coldwell
By
Whitaker Prevost Attorneys

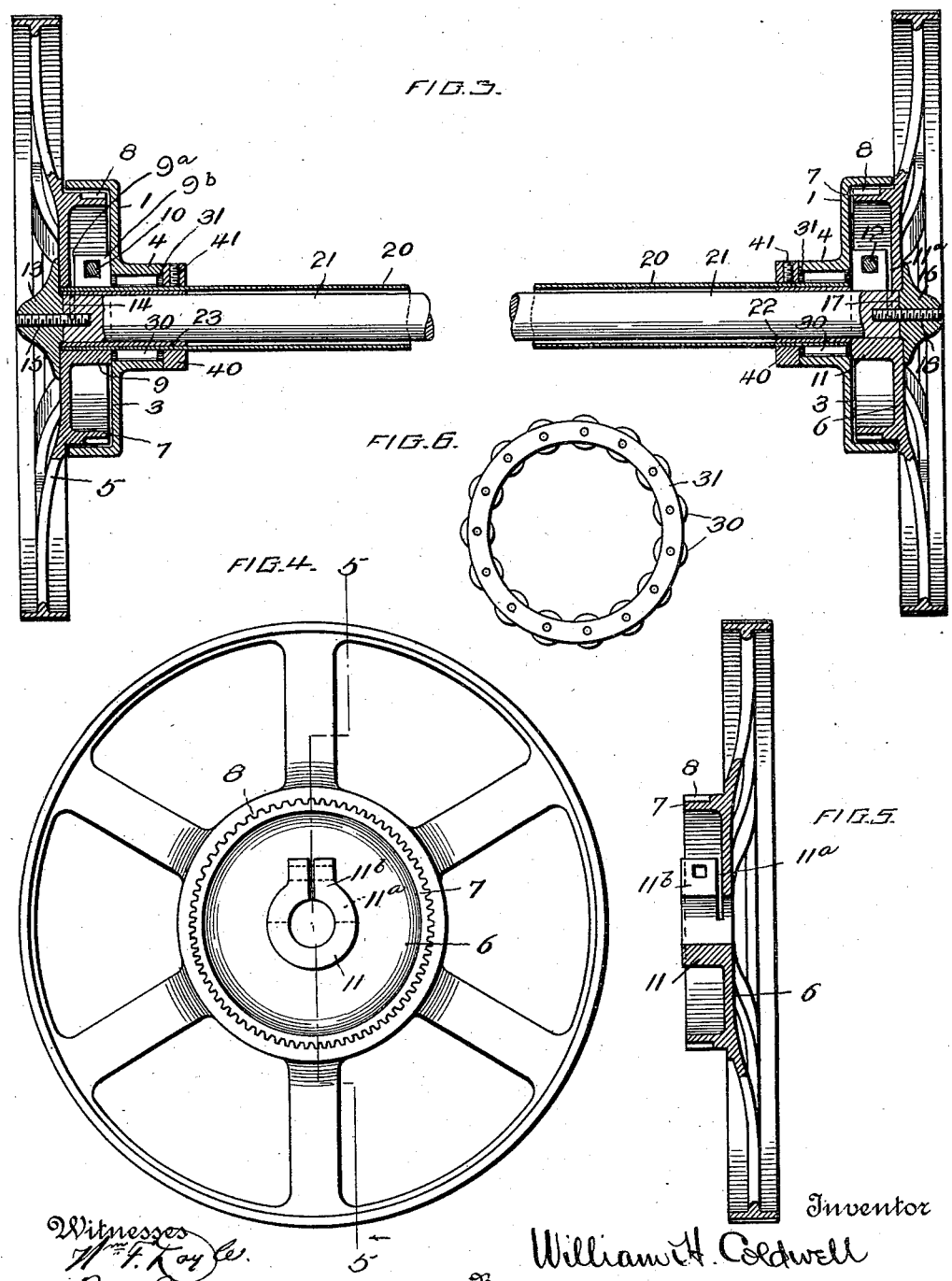

UNITED STATES PATENT OFFICE.

WILLIAM H. COLDWELL, OF NEWBURGH, NEW YORK.

LAWN-MOWER.

1,082,931.  Specification of Letters Patent.  Patented Dec. 30, 1913.

Application filed May 6, 1913. Serial No. 765,918.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn mowers and consists in the novel features hereinafter described, reference being had to the accompanying drawings which show one embodiment of the invention which I have selected for purposes of illustration, and the said invention is fully disclosed in the following description and claims.

Figure 1:
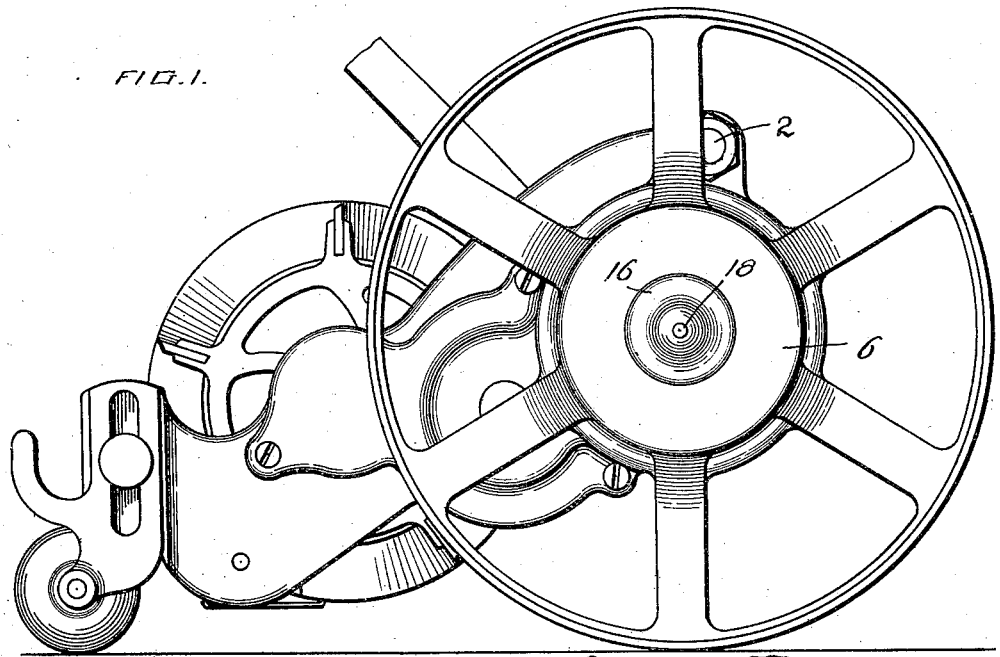
Figure 2:
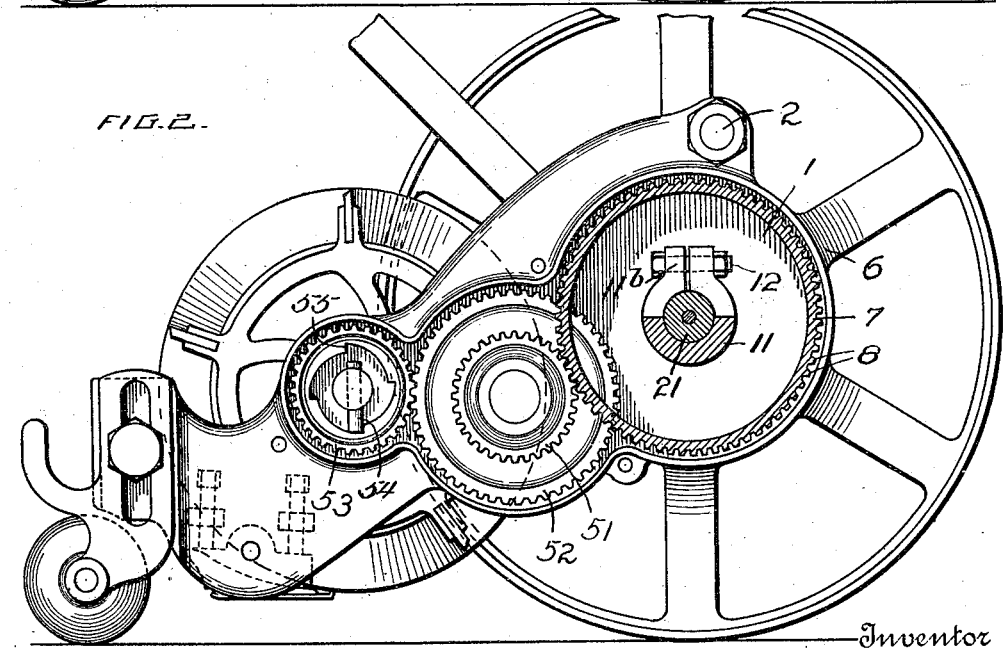

Referring to the accompanying drawings, Figure 1 is a side elevation of a lawn mower having my invention embodied therein. Fig. 2 is a longitudinal section through the gear casing on one side of the machine. Fig. 3 is a transverse vertical section of the machine through the axes of the driving and supporting wheels. Fig. 4 is a side elevation taken from the inner side, of one of the wheels detached, showing the means for clamping the transverse sleeve thereto. Fig. 5 is a vertical sectional view of the wheel on line 5—5 of Fig. 4. Fig. 6 is a detail end elevation of one set of bearing rollers, showing one of the spacing rings therefor.

In the manufacture and use of lawn mowers, it is desirable to provide bearings of as great length as possible for the driving and supporting wheels of the machine, and this has been difficult of accomplishment, owing to the necessity of not encroaching upon the central portion of the mower in which the revolving cutter is mounted. Where the usual short bearings are employed, there is apt to be a certain amount of wabbling motion to the wheels which is aggravated by wear of the parts and which is specially noticeable in so called "high wheel" lawn mowers, or those having wheels of considerable diameter.

The object of my invention is to provide a lawn mower with a bearing structure in which each wheel is practically provided with a bearing on each side of the machine, whereby the wheels will revolve accurately at all times, and even in case of severe wear will not be permitted any appreciable lateral play.

In the embodiment of my invention, selected by me for purposes of illustration, 1, 1, represent the side frames of the mower which are connected by suitable cross bars 2, so as to form a rigid structure. Each of the side frames is provided preferably with a circular recess portion 3 and with a hub 4 projected inwardly or toward the center of the machine and arranged concentrically with the recess 3, and having formed within said hub a bearing recess.

5 and 6 represent the supporting and driving wheels of the mower, which in this instance are of considerable diameter and are each provided with an annular flange 7 adapted to enter the recess 3 in one of the side frames, said flange 7 having gear teeth 8 on its periphery and forming the driving gear. Each of said wheels is provided with a central hub concentric with the gear wheel thereof, the hub 9 of one of the wheels, as wheel 5 in the accompanying drawing, being bored to fit a transversely extending sleeve or tube 20, preferably made of steel, which extends through the hubs 4, 4, of the side frames and is rotatably mounted in said hubs. I prefer to provide each hub 4 with a roller bearing, one of which is shown in detail in Fig. 6, and which comprises a series of rollers 30 having reduced end portions rotatably mounted in annular retaining devices or rings 31, the said rollers 30 being adapted to engage and support the sleeve or tube 20.

The wheel 5 is rigidly secured to one end of the sleeve 20 which projects through and beyond the adjacent bearing as indicated at the left in Fig. 3, and for convenience in attaching the wheel to the sleeve, I prefer to form the hub 9 of the wheel as a split clamp formed integrally with the wheel and having the portions of the clamp adjacent to the divided side thereof cored out as indicated at $9^a$ or otherwise spaced away from the wheel for substantially half the diameter of the clamp, so as to provide resilient portions $9^b$, which can be drawn together slightly upon the sleeve 20, to rigidly secure the wheel thereto, by means of a screw 10. The other wheel 6 is provided with a similar hub 11, which is preferably made in the form of a clamp in the same manner as previously described and provided with resilient clamping portions $11^b$ separated from the wheel at 11ª, and connected by a screw 12, the hub 11, however, being bored with a suitable aperture to receive a shaft 21, which extends entirely through the sleeve 20, from one side of the machine to the other, and projects beyond the sleeve at the end adjacent to the wheel 6, so that the said wheel may be rigidly clamped thereto. Hub 11 with the clamping portions 11ᵇ of wheel 6 is clearly illustrated in Figs. 4 and 5, and it will be understood that the construction of the hub 9 is exactly similar with the exception that central aperture (of hub 9) is of sufficient size to receive the sleeve 20 instead of the shaft 21. The shaft 21 is rotatably mounted in the sleeve 20, and in order to reduce friction, I prefer to provide either the shaft or the sleeve with bushings 22, 23 adjacent to the opposite ends of the sleeve, which bushings will ordinarily be made of brass and held frictionally in the ends of the sleeve. It is necessary to provide means for holding the sleeve and shaft from relative longitudinal movement, and for this purpose I prefer to employ a boss 13 secured to the end of the shaft adjacent to the wheel which is connected to the sleeve 20, that is to say the wheel 5, said boss engaging the exterior surface of the wheel adjacent to its central portion. As herein shown, the boss 13, which I sometimes term a nut is provided with a centrally threaded aperture, and an annular projecting portion 14, on its inner face, which is adapted to pass into the end of the bushing 23, and engage the end of the shaft 21, a screw 15 being employed to secure the boss 13 to the shaft. For symmetry, I prefer to provide the opposite end of the shaft with a similar boss or nut 16, having an annular projection 17, to engage the end of the shaft and extend slightly into the hub aperture of the wheel, said boss being secured to the shaft by a screw 18.

In order to close the inner ends of the hubs 4 of the side frames I employ collars 40 surrounding the sleeve 20 and secured in place thereon by set screws 41, but this is not essential as the collars 40 might be made integrally with or secured to the hubs 4, if desired.

In assembling the parts, the bearings 30 are placed in the bearing recesses 4, the wheel 5 is clamped or otherwise secured to the sleeve 20 and the wheel 6 is clamped or otherwise secured to the shaft 21. The sleeve 20 is then passed through the bearings in both side frames from one side of the machine and the shaft 21 is passed through the sleeve 20 from the opposite side of the machine when the nut or boss 13 is secured to the end of the shaft 21 opposite wheel 6, thus holding all the parts firmly in position, but permitting the free rotation of the wheels, the tube 20 and shaft 21. By removing the boss 13, the parts can be taken apart in the reverse order. It will be noted that when the machine is moved forward in a straight line, so that the wheels 5 and 6 move in unison, the shaft 21 and sleeve 20 will turn as one part and there will be no relative rotation between them. In moving in a curved path, however, or whenever one wheel is rotated more rapidly than the other, a relative rotation of the tube or sleeve 20 and the shaft 21 takes place. It will thus be seen that as the machine is usually driven in a straight line, the major part of the wear will be between the sleeve 20 and the roller bearings 30, and the minimum wear will be upon the bearings or bushings between the shaft 21 and sleeve 20. It will also be seen that each wheel is practically provided with a bearing on each side of the machine, so that the wheels are supported in a very rigid manner while being perfectly free to rotate with minimum friction, and that even in the case of excessive wear of the bearings for the shaft or the sleeve, the accurate running of the wheels will not be materially affected.

The driving wheels, either one or both, and preferably both, are operatively connected to the rotary cutter 50 of the machine, by means of a train or trains of gearing. In the present instance, I have shown at each side of the machine, a pinion 51 meshing with the gear 8 of the adjacent driving wheel, and having formed therewith or secured thereto, a gear 52, which meshes with a pinion 53 on the shaft of the rotary cutter, and connected thereto by any usual or preferred pawl and rachet mechanism. In the present instance, I provide the cutter shaft at each end with a transverse pin 54, movable lengthwise through the shaft and adapted to engage ratchets 55 formed on the interior of a recessed portion of the pinion, so that the pinion will drive the cutter shaft when moved in one direction and will slip with respect thereto when moved in the opposite direction.

What I claim and desire to secure by Letters Patent is:

1. In a lawn mower, the combination with the main frame, provided with a supporting bearing at each side of the same, of a rotatable sleeve extending across the machine and engaging both of said bearings, a shaft extending through said sleeve and having portions lying within both of said bearings, said shaft being rotatable with respect to said sleeve, and driving wheels one of which is secured to said sleeve and the other of which is secured to the said shaft.

2. In a lawn mower the combination with the side frames provided with supporting bearings of a sleeve extending through said bearings from one side of the machine to the other, a shaft extending concentrically through said sleeve, bushings interposed between said shaft and sleeve, said shaft projecting beyond the sleeve at one end, and wheels, one of which is rigidly secured to said sleeve, and the other of which is rigidly secured to the projecting portion of said shaft.

3. In a lawn mower, the combination with the side frames, provided with supporting bearings, of a sleeve extending through said bearings from one side frame to the other, a shaft extending concentrically through said sleeve and mounted to rotate therein and having a portion at one end projecting beyond the end of the sleeve, a wheel secured rigidly to one end of said sleeve, a wheel secured rigidly to the projecting end of said shaft, and a retaining device secured to the opposite end of said shaft for holding said wheels from lateral movement, whereby by removing said retaining device from the shaft, both the shaft and sleeve may be withdrawn from said bearings without disengaging the wheels therefrom.

4. In a lawn mower the combination with the side frames provided with bearings, a sleeve extending through said bearings from one side of the machine to the other, a shaft extending concentrically through said sleeve, and rotatable with respect thereto, a wheel mounted on one end of the sleeve, a wheel mounted on one end of said shaft projecting beyond the adjacent end of the sleeve, and means for preventing relative longitudinal movement of the shaft and sleeve.

5. In a lawn mower the combination with the side frames provided with bearings, a sleeve extending through said bearings from one side of the machine to the other, a shaft extending concentrically through said sleeve and rotatable with respect thereto, a wheel mounted on one end of the sleeve, a wheel mounted on one end of said shaft projecting beyond the adjacent end of the sleeve, and clamps formed integrally with said wheels for rigidly connecting them to said sleeve and shaft, and means for preventing the relative longitudinal movements of the sleeve and shaft.

6. In a lawn mower, the combination with the side frames provided with alined bearing recesses, roller bearings located therein, a sleeve extending through said bearings from one side of the machine to the other, a wheel rigidly secured to one end of said sleeve, a concentric shaft extending through said sleeve and mounted rotatably therein, and projecting therefrom at the end opposite that to which said wheel is connected, a wheel rigidly secured to the projecting end of said shaft, and a retaining device secured to the other end of the shaft and engaging the other wheel to prevent longitudinal movement of said shaft and sleeve.

7. In a lawn mower the combination with the side frames provided with alined bearing recesses roller bearings located therein, a sleeve extending through said bearings from one side of the machine to the other, a wheel rigidly secured to one end of said sleeve, a concentric shaft extending through said sleeve and mounted rotatably therein, and projecting therefrom at the end opposite that to which said wheel is connected, a wheel rigidly secured to the projecting end of said shaft, and a retaining device secured to the other end of the shaft and engaging the other wheel to prevent longitudinal movement of said shaft and sleeve, and collars detachably secured to said sleeve and engaging the inner ends of said bearing recesses in the side frames.

In testimony whereof I affix my signature, in the presence of two witnesses.

WILLIAM H. COLDWELL.

Witnesses:
EDWIN T. SMITH,
HENRY W. MURTFELDT.